US012699022B2

(12) United States Patent
Schuebel

(10) Patent No.: US 12,699,022 B2
(45) Date of Patent: Aug. 4, 2026

(54) METHOD FOR ASSESSING THE VIBRATION BEHAVIOR OF AN ELECTRIC MOTOR, AND CORRESPONDING ELECTRIC MOTOR AND FAN

(71) Applicant: ZIEHL-ABEGG SE, Künzelsau (DE)

(72) Inventor: Dominik Schuebel, Kunzelsau (DE)

(73) Assignee: ZIEHL-ABEGG SE, Künzelsau (DE)

( * ) Notice: Subject to any disclaimer, the term of this patent is extended or adjusted under 35 U.S.C. 154(b) by 285 days.

(21) Appl. No.: 18/555,957

(22) PCT Filed: Mar. 22, 2022

(86) PCT No.: PCT/DE2022/200051
§ 371 (c)(1),
(2) Date: Oct. 18, 2023

(87) PCT Pub. No.: WO2022/223082
PCT Pub. Date: Oct. 27, 2022

(65) Prior Publication Data
US 2024/0210271 A1      Jun. 27, 2024

(30) Foreign Application Priority Data

Apr. 20, 2021    (DE) ..................... 10 2021 203 932.4

(51) Int. Cl.
*G01M 7/02*          (2006.01)
*G01M 7/00*          (2006.01)
(52) U.S. Cl.
CPC .............. *G01M 7/025* (2013.01); *G01M 7/00* (2013.01)
(58) Field of Classification Search
CPC ................................. G01M 7/00; G01M 7/025
(Continued)

(56) References Cited

U.S. PATENT DOCUMENTS

H1006 H * 12/1991 Zwicke .......................... 73/660
6,289,735 B1 * 9/2001 Dister ................... G01H 1/003
                                                        73/659
(Continued)

FOREIGN PATENT DOCUMENTS

CN       108177646 A  *  6/2018  ............ B60W 30/19
CN       105890742 B   *  3/2019  ............ G08B 21/18
(Continued)

OTHER PUBLICATIONS

Translation_CN105890742 (Year: 2019).*
(Continued)

*Primary Examiner* — Peter J Macchiarolo
*Assistant Examiner* — Monica S Young
(74) *Attorney, Agent, or Firm* — FisherBroyles, LLP; Jason P. Mueller

(57)          ABSTRACT

A method is disclosed for assessing a vibration behavior of an electric motor, in particular an electric motor of a fan, and/or its operating environment. This method includesgenerating (S1) recorded vibration values by recording vibrations of at least one part of the electric motor (1), ascertaining (S2) a first assessment measure for the recorded vibration values, determining (S3) a spectral component of the recorded vibration values for an assessment frequency, ascertaining (S4) a second assessment measure for the spectral component of the recorded vibration values, and assessing (S5) the vibration behavior by comparing the first assessment measure with the second assessment measure. A corresponding electric motor, fan, and system is disclosed.

18 Claims, 5 Drawing Sheets

(58) Field of Classification Search
USPC .......................................................... 73/579
See application file for complete search history.

(56) References Cited

U.S. PATENT DOCUMENTS

| 7,228,240 | B2 * | 6/2007 | Duron | G01M 5/0033 |
| | | | | 73/660 |
| 9,243,551 | B2 * | 1/2016 | Sun | F02B 37/24 |
| 2004/0236494 | A1 * | 11/2004 | DeBotton | G01M 15/12 |
| | | | | 701/111 |
| 2004/0243310 | A1 * | 12/2004 | Griffin | G01H 1/006 |
| | | | | 702/10 |
| 2008/0309274 | A1 * | 12/2008 | Thomson | H02P 8/14 |
| | | | | 318/567 |
| 2013/0211737 | A1 * | 8/2013 | Batcheller | G01M 7/00 |
| | | | | 701/32.7 |
| 2017/0082828 | A1 * | 3/2017 | Sumioka | G03B 5/00 |
| 2020/0003736 | A1 * | 1/2020 | Bittner | G01N 29/46 |

FOREIGN PATENT DOCUMENTS

| CN | 109995300 | A | * | 7/2019 | H02P 23/14 |
| CN | 111251900 | A | * | 6/2020 | B60L 15/20 |
| DE | 102007017708 | A1 | * | 10/2008 | H02K 11/20 |
| DE | 202019101262 | | | 3/2019 | |
| DE | 102018210470 | | | 1/2020 | |
| DE | 102018211838 | A1 | | 1/2020 | |
| DE | 102018211846 | | | 1/2020 | |
| DE | 102018211850 | A1 | | 1/2020 | |
| DE | 102020206626 | B3 | * | 6/2021 | H02P 21/05 |
| WO | 2016089238 | | | 6/2016 | |
| WO | WO-2020015794 | A1 | * | 1/2020 | G01H 1/003 |

OTHER PUBLICATIONS

Translation 2020015794 (Year: 2020).*
International Preliminary Report on Patentability issued in App. No. PCT/DE2022/200051, mailing date Nov. 2, 2023, 7 pages.

* cited by examiner

METHOD FOR ASSESSING THE VIBRATION BEHAVIOR OF AN ELECTRIC MOTOR, AND CORRESPONDING ELECTRIC MOTOR AND FAN

CROSS REFERENCE

This application is a national stage entry application under 35 U.S.C. 371 of PCT Patent Application No. PCT/DE2022/200051, filed on 22 Mar. 2022, which claims priority to German Patent Application No. 10 2021 203 932.4, filed on 20 Apr. 2021, the entire contents of each of which are incorporated herein by reference.

FIELD

The disclosure relates to a method for assessing a vibration behavior of an electric motor, in particular an electric motor of a fan, and/or its operating environment, as well as an electric motor, a fan, and a system, each of which may be designed to carry out the method.

BACKGROUND

When an electric motor is operated—regardless of whether it is operated properly or improperly—vibrations are excited. These vibrations can originate from the electric motor itself and/or be excited by a load driven by the electric motor (for example an impeller of a fan) and/or by an operating environment of the electric motor. In practice, harmonic excitations (for example due to unbalance), stochastic excitations (for example due to noise), or pulsed excitations (for example due to impacts or impact sequences) can occur. If these excitations excite a structure-specific natural movement, resonances can arise. Such resonances result in excessive vibrations.

Many resonances, in particular resonances induced by imbalances, depend on the speed of the electric motor. Since resonances have a negative effect on the operation of the electric motor, for example, due to increased noise development or by negatively affecting the service life of the electric motor, attempts are made to avoid operating the electric motor at speeds that cause resonances as much as possible. This can be done, for example, by quickly exceeding these speeds and/or by not allowing operation at these speeds. This approach is usually possible problem-free, especially with a fan.

If operation at a resonance point is to be avoided, the speeds at which resonances are induced have to be known. For this purpose, measuring an electric motor in a test bench after production is known. Since these speeds have various influencing factors and usually depend on the respective installation location of the electric motor, determining resonance points in a test bench before delivery of the electric motor is often not sufficient. Electric motors are therefore known in which sensors for vibration detection are installed. Such an electric motor is described, for example, in DE 10 2018 211 838 A1 and in DE 10 2018 211 846 A1.

Detecting resonance points requires scanning vibrations of the electric motor over at least parts of the possible operating speeds of the electric motor. In the case of fans in particular, this scanning usually takes place during running up or running down. When running up, the fan is accelerated from a minimum speed (usually when the fan is at a standstill) to a maximum speed in a predetermined time, ideally with a linear speed ramp. During running down, the speed is reduced from a non-zero starting speed (usually maximum speed) to a minimum speed. In both cases, the vibrations of the electric motor are detected and evaluated depending on the speed. For such a detection of vibration behavior, reference is made, for example, to DE 20 2019 101 262 U1 and DE 10 2018 211 850 A1.

If a recorded vibration value exceeds a predefined limit, for example 7 millimeters/second (RMS—Root Mean Square) or 9 millimeters/second (RMS), it is concluded that a resonance point exists. Such limiting values are often defined in norms or other regulations, for example ISO14694. All speeds at which this limiting value is exceeded are recorded as "forbidden" speeds and, if possible, are ignored or quickly exceeded during subsequent operation.

The disadvantage of such an evaluation of the vibration behavior of the electric motor is that running up or running down is necessary. In application scenarios in which resonances are unchangeable, such a test run when commissioning the electric motor is sufficient. In practice, however, resonance points change, for example as a result of deposits or wear/aging or changes in the operating environment of the fan, for example due to adjustments or expansion of the system or maintenance. In such cases it is at least occasionally necessary to carry out a new test run. In particular for electric motors that are used in continuous operation, additional maintenance windows are required, which can result in considerable costs.

SUMMARY

The present disclosure is therefore based on the object of designing and refining a method, an electric motor, a fan, and a system of the type mentioned in such a way that the vibration behavior of an electric motor, if possible with load and/or operating environment, can be assessed flexibly and reliably, wherein an assessment during ongoing operation of the electric motor is desirable.

The above object is achieved, in an embodiment, by the features of claim 1. Accordingly, the method in consideration comprises the following steps:

generating recorded vibration values by recording vibrations of at least one part of the electric motor by means of a vibration sensor, ascertaining a first assessment measure for the recorded vibration values, wherein the first assessment measure is representative of the strength of the vibrations of the at least one part of the electric motor, determining a spectral component of the recorded vibration values for an assessment frequency, ascertaining a second assessment measure for the spectral component of the recorded vibration values, wherein the second assessment measure is representative of the strength of the vibrations of the at least one part of the electric motor at the assessment frequency, and assessing the vibration behavior by comparing the first assessment measure with the second assessment measure.

The above object is achieved, in an embodiment, with regard to an electric motor by the features of independent claim 10. Accordingly, the electric motor in consideration comprises:

a vibration sensor which is designed to record vibrations of at least one part of the electric motor and to generate recorded vibration values, a first assessment unit which is designed to ascertain a first assessment measure, wherein the first assessment measure is representative of the strength of the vibrations of the at least one part of the electric motor, an analysis unit which is designed to determine a spectral component of the recorded vibration values for an assessment frequency, a second assessment unit, which is designed to ascertaina second assessment measure for the spectral component of the recorded vibration values, wherein the second assessment measure is representative of the strength of the vibrations of the at least one part of the electric motor at the assessment frequency, and an evaluation unit which is designed to assess the vibration behavior by comparing the first assessment measure with the second assessment measure.

The above object is achieved with regard to a fan, in an embodiment, by the features of further independent claim 15. The fan in consideration accordingly includes an impeller and an electric motor according to the disclosure, wherein the impeller is coupled to a rotor of the electric motor.

The above object is achieved with regard to a system, in an embodiment, by the features of further independent claim 16. The system in consideration accordingly includes an operating environment and a drive, wherein the drive includes an electric motor according to the disclosure and/or a fan according to the disclosure, wherein the operating environment interacts with the drive, and wherein the drive is designed to record and assess both vibrations of the drive and vibrations of the operating environment.

It has initially been recognized that the vibration behavior of an electric motor or a system comprising the electric motor is dominated in the range of a resonance frequency by a harmonic vibration. A signal curve of recorded vibration values then approaches a sinusoidal curve. It has also been recognized that a comparison of a strength of a vibration at the resonance frequency with a strength of a vibration over all detected frequencies can be used very well to judge the vibration behavior. Running up or running down is therefore no longer absolutely necessary, rather a resonance point can be detected from a "snapshot" of the recorded vibration behavior in the ongoing operation of the electric motor. This knowledge is used in the method according to the present disclosure.

In the method according to the present disclosure, recorded vibration values are first generated by recording vibrations of at least a part of the electric motor by means of a vibration sensor. This recording usually takes place over a recording time window. A first assessment measure is ascertained for the recorded vibration values, which is representative of the strength of the vibrations of the at least one part of the electric motor. Furthermore, a spectral component for an assessment frequency is determined from the recorded vibration values. This means that it is determined how large the component of recorded vibrations is at the assessment frequency. A second assessment measure is determined for the spectral component, which is representative of the strength of the vibrations of the at least one part of the electric motor at the assessment frequency. By comparing the first assessment measure with the second assessment measure, it can be determined how large the component of a harmonic vibration at the assessment frequency is in comparison to the vibrations over the entire spectrum.

How exactly such a comparison is carried out is not important, as long as the comparison can provide information about the component of harmonic vibration at the assessment frequency compared to the vibrations over the entire spectrum. In one embodiment, the comparison can be carried out via the ratio between the second assessment measure and the first assessment measure. If this ratio exceeds a limiting value, it can be decided that a resonance point exists.

It can be seen that the method according to the present disclosure does not necessarily require running up or running down. Rather, a current operating status can be assessed directly. This enables a status check of the electric motor in ongoing operation. Nevertheless, the method can also be used when running up or running down, for example, in order to be able to obtain a comprehensive picture of the vibration behavior of the electric motor. When assessing in ongoing operation, the vibration behavior can be assessed repeatedly, for instance periodically. For example, a new assessment can be initiated after passage of 15 minutes, an hour, or a day. In particular, with a repeated assessment, changes in the electric motor, the load driven by the electric motor, and/or its operating environment can be detected and—if necessary—suitable measures can be taken.

In principle, the recording time window can be selected arbitrarily. However, it is advisable not to select the recording time window excessively narrow so that the time window has a sufficiently small effect on the specific spectral component and the vibration signals are recorded sufficiently well. At the same time, the recording time window is not to be excessively large, as changes, for example in the speed of the electric motor or in the operating environment, could falsify the recorded vibration values. The dimensioning of the recording time window will depend on the respective application situation of the electric motor or its operating environment. In one embodiment, the recording time window is at least one period length of a harmonic vibration signal wide. In another embodiment, the recording time window is multiple period lengths of a harmonic vibration signal wide, wherein it is advisable to select the recording time window to be a maximum of 10 period lengths wide.

The assessment frequency can also be selected relatively arbitrarily. What is probably important here is that resonances can also be expected at a selected assessment frequency. Very low assessment frequencies, for example below 2 Hertz, are likely to be just as unhelpful in many cases as very high assessment frequencies, for example in the range of several kilohertz. The assessment frequency can be selected relatively freely or assessment frequencies can be used in a quantization, for example at an interval of 5 or 10 Hertz. When selecting the assessment frequencies, frequencies that lie at a resonance point detected from previous measurements can also be selected. If a change in the resonance frequency is to be expected, the assessment frequency can also be selected around the previously measured resonance frequency. This short list shows how flexibly the assessment frequency can be selected. The assessment frequency can also be selected in a particularly advantageous manner depending on the speed of the electric motor.

The assessed vibration behavior can be triggered by a wide variety of excitations. The vibrations can originate from the electric motor itself, from the driven load, for example an impeller, and/or from an operating environment of the electric motor. As long as the vibrations can be recorded by the vibration sensor, they can be assessed using the method disclosed here.

The operating environment here is understood to be the area around the electric motor, which has a reaction to the electric motor. This particularly refers to mechanical reactions. For example, the operating environment can be formed by a part of the system to which the electric motor is connected. If the electric motor is part of a fan, the operating environment can, for example, additionally include a distribution system, using which the air moved by the fan is directed. The operating environment can have additional vibration generators. An impeller that is driven by the electric motor can be considered part of the operating environment.

The recorded vibration values can be represented in different ways. The recorded vibration values can be described by simple scalars that indicate an amplitude of the vibrations independently of the direction of the vibration. The recorded vibration values can also be vectors that, for example, indicate vibrations in three different spatial directions. The only important thing for the present disclosure is that an assessment measure can be ascertained from the recorded vibration values, which can practically always be achieved. How specifically the vibration values are represented, in which directions vibrations are recorded, and whether the vibrations are recorded along one or more axes can depend on the respective application scenario.

The vibration sensor that records the vibrations can be designed in different ways and can be based on a wide variety of technologies. As an example, reference is made to a MEMS sensor (micro-electro-mechanical system). Depending on the vibration values to be recorded, the sensor can measure in one or more directions.

The vibration sensor itself can be arranged at different points. In one embodiment, the vibration sensor is arranged on the outside of the electric motor. The vibration sensor can be located here in a housing that is arranged on the outside of the electric motor. In another embodiment, the vibration sensor is integrated into the electric motor and is therefore part of the electric motor. Such an electric motor is disclosed, for example, in DE 10 2018 211 838 A1, which was already mentioned in the introduction.

The results of an assessment can be used in a wide variety of ways. The assessment results can be used in the prediction of the life expectancy of the electric motor or components of the electric motor. For example, it can be stated how the current load case affects the service life of the electric motor. The assessment results can also be transmitted to a cloud so that they can be used there, for example, to monitor the status or improve the electric motor. The sensor signals and/or assessment results can also be entered into a digital twin of the electric motor, for example for a more extensive assessment of the operating state of the electric motor. This short and non-exhaustive list shows how comprehensively the present disclosure can be used.

In one embodiment, the assessment frequency is formed by an order of a base frequency, wherein the base frequency is dependent on a speed of the electric motor. In this way, the selection of the assessment frequency can be simplified. A dependency between base frequency and speed can be achieved, for example, by the base frequency being formed by the rotation frequency, i.e., the revolutions of the electric motor per second. An order of a base frequency is a multiple of this base frequency, i.e., the nth order corresponds to n times the base frequency. The current speed can be determined in a wide variety of ways. For example, a speed sensor can be used. Since information about the speed is available anyway, especially with electronically commutated electric motors, this information can also be transferred from a motor controller.

In one refinement, a first order is used as the assessment frequency to ascertain a resonance caused by unbalance.

In one embodiment, the vibration behavior is assessed for multiple assessment frequencies. This approach is particularly useful when multiple different resonance effects are to be examined. Since different resonance effects manifest themselves in different resonance frequencies (when using orders of a base frequency in different orders), different resonance effects can be assessment by using multiple assessment frequencies. When selecting the multiple assessment frequencies, knowledge about the resonance effects that are likely to occur can be used. This knowledge can, for example, originate from detailed measurements of identical or similar electric motors and/or from simulations.

In one embodiment, a detected resonance point is additionally assessed by comparing an amplitude of the recorded vibration values with a predetermined amplitude limiting value and/or ascertaining a vibration shape and/or a vibration mode and/or carrying out other assessments. Assessing the amplitude enables a distinction to be made between critical and non-critical resonance points and the effects of the resonance points on the electric motor and its operating environment. The amplitude limiting value can be determined from experiential values or from calculations. They can also originate from norms or other regulations, such as ISO14694. For example, amplitude limiting values of 7 millimeters/second (RMS) or 9 millimeters/second (RMS) would be conceivable.

Ascertaining the vibration shape enables a statement to be made about how the excited structure vibrates. Ascertaining the vibration mode enables a summary description of the vibrations in terms of frequency, vibration shape, and damping.

In one embodiment, the assessment of the vibration behavior is carried out when the electric motor is started up and/or during ongoing operation of the electric motor and/or after a predefined time span has elapsed and/or when an operating parameter of the electric motor is changed. An assessment during commissioning can ascertain how a specific electric motor behaves in terms of vibration in a specific operating environment. Running up or running down can be carried out. An assessment during ongoing operation is particularly helpful in application situations in which the electric motor is used in continuous operation. Furthermore, such an assessment also makes it possible to detect changing vibration behavior during operation. An assessment after passage of a predefined time span enables defined and comprehensive monitoring of the vibration behavior. In this way, changes in vibration behavior can also be reliably detected. The predefined time span can be selected depending on the respective operating environment. In operating environments with highly variable parameters, for example due to adhesions on an impeller driven by the electric motor, a shorter time span may be appropriate than in an operating environment in which the parameters are largely stable. Accordingly, the time span can be in the range of minutes, hours, days, weeks, or even months. An assessment when operating parameters change enables vibration behavior that could also change with changed operating parameters to be quickly assessed.

In one embodiment, a suggestion for mitigating negative effects of a resonance point is generated and/or output based on a result of an assessment the vibration behavior, wherein the suggestion includes a location and/or extent of a balancing mass and/or a suppression corridor. In this way, a user can be offered further added value, as any unfavorable vibration behavior can thus be improved.

In one embodiment, the presence of a resonance point is decided when the ratio between the second assessment measure and the first assessment measure exceeds a predetermined limiting value, wherein the predetermined limiting value being greater than or equal to 50%, greater than or equal to 60%, greater than or equal to 70%. The specification of the limiting value probably depends on the spectrum of the recorded vibration values. Furthermore, it can be taken into consideration how closely the recorded vibrations approach a sinusoidal vibration in the electric motor to be evaluated or in the operating environment. With a limiting value greater than or equal to 50%, resonance points can be reliably detected. A limiting value greater than or equal to 60% further improves detection. With a limiting value greater than or equal to 70%, a resonance point can be detected particularly reliably.

In one embodiment, the first and/or the second assessment measure is determined by forming an effective value. Such an effective value can be formed, for example, by a root mean square (RMS). An effective value represents an assessment measure that is easy to calculate and nonetheless informative.

In one embodiment of the electric motor, the vibration sensor is designed to record vibrations along multiple axes, wherein the multiple axes stand perpendicular to one another in pairs and wherein one of the multiple axes is arranged parallel to a motor axis/motor shaft of the electric motor. In this way, further information about the vibration behavior can be obtained and the assessment of the vibration behavior and/or a resonance point can be further improved In one embodiment, the vibration sensor is designed to record a vibration velocity and/or a vibration acceleration.

In one embodiment, the electric motor includes a regulation system that is designed to adjust regulation and/or control of the electric motor based on an assessment of the vibration behavior. This enables a direct utilization of the assessed vibration behavior. The regulation system and units used for the assessment, for example the assessment units, the analysis unit, and/or the evaluation unit, can be implemented in common electronics. For example, motor electronics arranged in an electronics housing of the electric motor would be conceivable.

In one embodiment, the electric motor includes an output unit which is designed to output information about an assessment of the vibration behavior. This allows the assessment results to be used flexibly. The output unit can be made wired, optical, and/or wireless. An optical output unit can be formed, for example, by a simple light, for example an LED (light-emitting diode), which signals a critical vibration state. The output unit can thus provide visual information. Alternatively or additionally, the output unit can provide communication "to the outside". This can include, for example, that the output unit enables information to be output to a higher-level control unit or information to be uploaded to a cloud system. In this way, the electric motor can be part of an Industry 4.0 environment.

In one embodiment, the analysis unit is designed to carry out a Fourier transformation, an FFT—Fast Fourier Transform—and/or a Görtzel algorithm and/or a more or less broad frequency band filtering. In principle, ascertaining a spectral component can be done in various ways, as long as an assessment of the vibrations at an assessment frequency is possible. Using an FFT provides a comprehensive picture of the spectral components. With the Görtzel algorithm, which was published by Gerald Görtzel in 1958, individual spectral components of a signal can be ascertained very efficiently. This means that a spectral component can be determined even with limited computing resources. Frequency band filtering makes it possible to restrict a vibration signal to specific frequencies of interest. Frequency band filtering can take place before determining the spectral components.

There are now various possibilities for advantageously designing and refining the teaching of the present disclosure. For this purpose, reference is made, on the one hand, to the claims subordinate to the independent claims and, on the other hand, to the following explanation of exemplary embodiments with reference to the drawings. In connection with the explanation of the exemplary embodiments with reference to the drawings, embodiments and refinements of the teachings are also explained in general.

DETAILED DESCRIPTION OF THE DISCLOSURE

Figure 1:
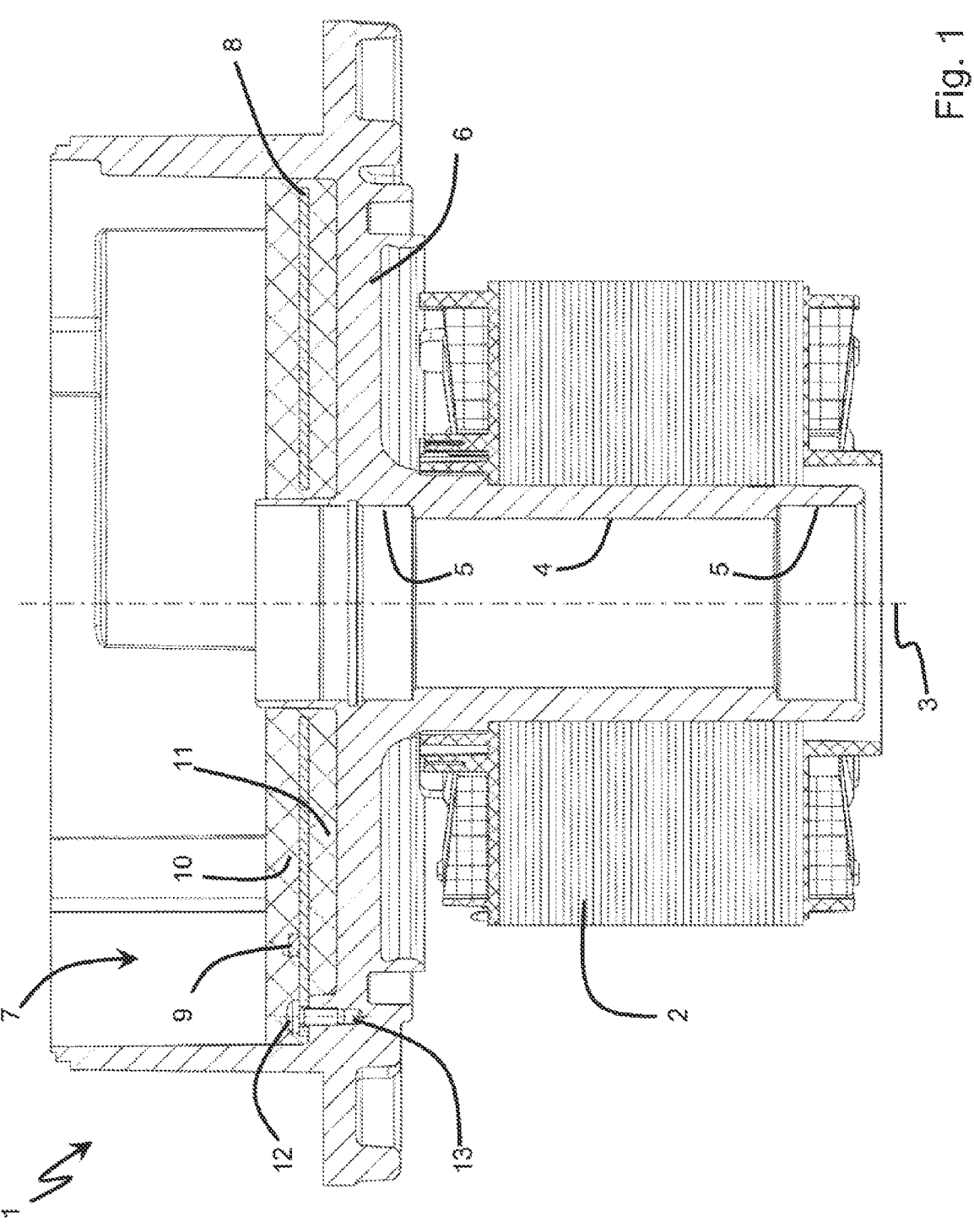
FIG. 1 shows a section through an exemplary embodiment of an electric motor according to the present disclosure.

FIG. 1 shows a section through a stator 2 of an exemplary embodiment of an electric motor 1 according to the present disclosure. In a motor axle 3, a bearing tube 4 is formed, at each of the longitudinal ends of which a bearing receiving area 5 is formed. Bearings (not shown) are accommodated in the bearing receiving areas 5, via which a shaft of the electric motor (also not shown) is rotatably mounted. A stator bushing 6 is formed by an aluminum component, at one end of which the bearing tube 4 is formed and at the other end of which an electronics housing 7 is formed to accommodate motor electronics. The motor electronics generate feed signals and output them to the stator and/or rotor windings. For the sake of clarity, only one circuit board 8 of the motor electronics is shown. A vibration sensor 9 is arranged on the circuit board 8. The circuit board 8 is embedded in a potting compound 10, 11, wherein the potting compound 10, 11 is connected to the edge region of the circuit board 8. In particular, the potting compound 10 functions here as a coupling element and transmits vibrations from the stator bushing 6 to the circuit board 10 and thus to the vibration sensor 9. A screw 12 is present as a further coupling element, which is screwed into a hole 13 in the electronics housing 7. In this way, the vibration sensor 9 can be arranged in an electric motor and record vibrations of at least part of the electric motor.

Figure 2:
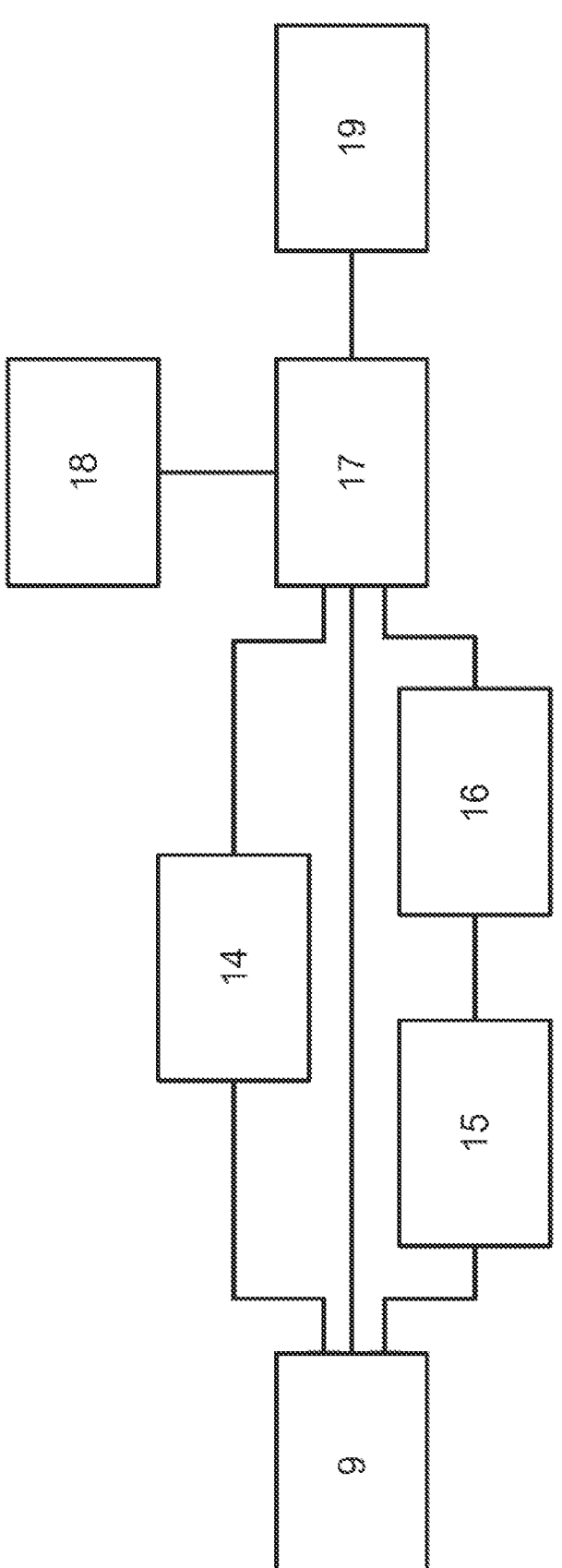
FIG. 2 shows a block diagram with functional units of an exemplary embodiment of an electric motor according to the present disclosure.

FIG. 2 shows a block diagram of functional units of the electric motor 1, which can be implemented on the circuit board 8. The vibration sensor 9 records vibrations of at least one part of the electric motor. The vibration values recorded in this way are transferred one the one hand to a first assessment unit 14 and on the other hand to an analysis unit 15 and an evaluation unit 17. The first assessment unit 14 determines a first assessment measure from the recorded vibration values. This first assessment measure indicates how strongly the one part of the electric motor vibrates. The analysis unit 15 determines a spectral portion of the recorded vibration values for an assessment frequency. This assessment frequency can be an order of rotation frequency, i.e., a multiple of the number of revolutions of the electric motor per second. The spectral component is fed to a second assessment unit 16, which uses it to determine a second assessment measure. The second assessment measure indicates how strongly the electric motor vibrates at the assessment frequency. The first and second assessment measures are formed by a root mean square.

The first assessment unit 14 and the second assessment unit 16 input the first and second assessment measures ascertained in each case into an evaluation unit 17, which compares the assessment measures with one another. For this purpose, a quotient is formed from the second assessment measure and the first assessment measure, which thus reflects the component of the vibrations having the assessment frequency in the overall vibration of the electric motor. The result of this quotient formation is compared with a predetermined limiting value, which is loaded from a limiting value memory 18. If the specified limiting value is exceeded, it is decided that a resonance point exists. In addition, the evaluation unit 17 judges the recorded vibration values in order to assess the criticality of the resonance point. If an amplitude limiting value, which can also be stored in the limiting value memory 18, is exceeded, a decision is made for a critical resonance point. Otherwise the resonance point is classified as uncritical. In addition, the evaluation unit 17 can carry out further evaluations of the resonance point, for example with regard to the vibration shape or the vibration mode. The information obtained in this way can be transferred to an output unit 19, which can output this information to a user, a higher-level control unit, the motor electronics, a cloud, or other systems.

Figure 3:
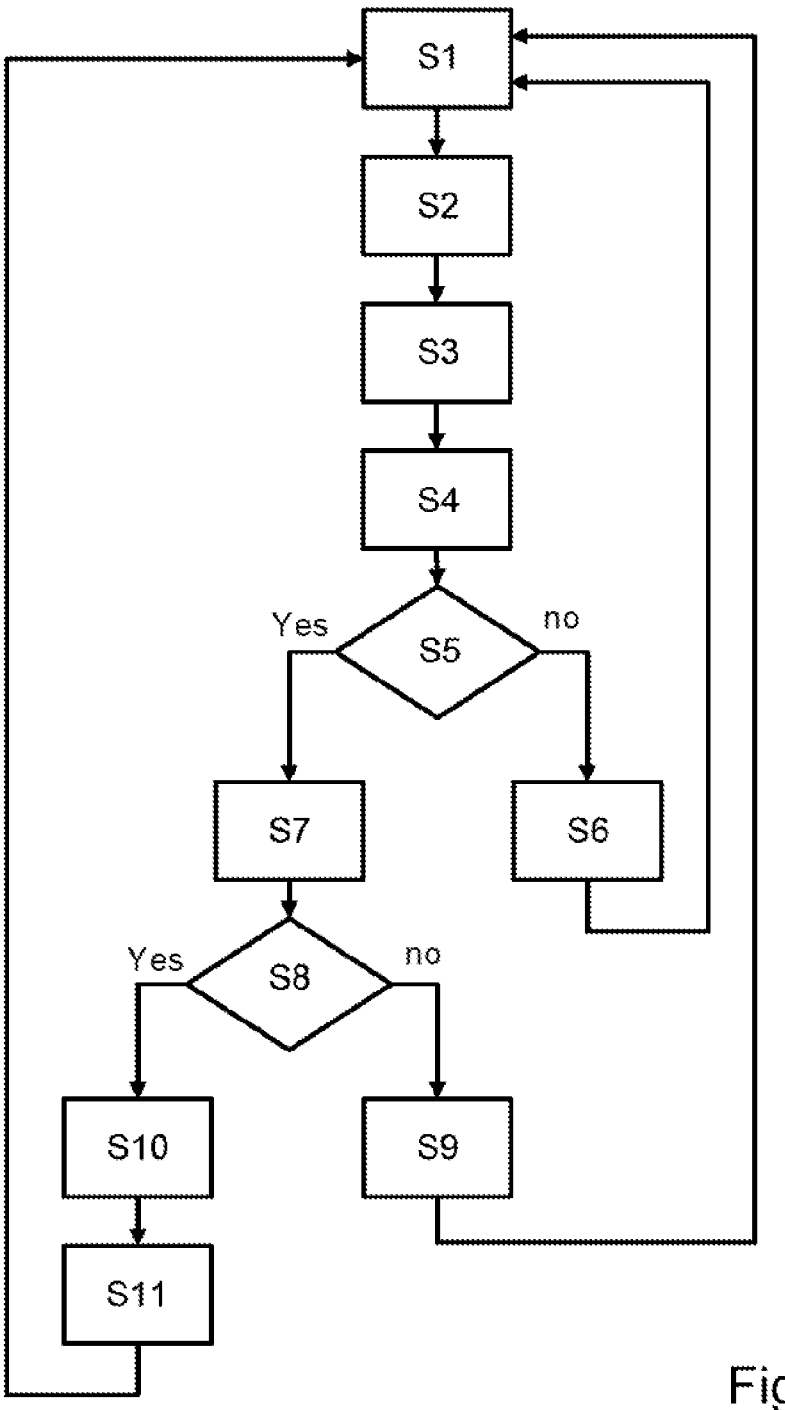
FIG. 3 shows a flow chart having steps of an exemplary embodiment of a method according to the present disclosure.

FIG. 3 shows a flow chart having steps of an exemplary embodiment of a method according to the present disclosure, In step S1, the method starts with the recording of vibration values by means of a vibration sensor 9. In step S2, the general vibration state of the electric motor 1 is determined. This is done by determining a first assessment measure for the recorded vibration values. This first assessment measure indicates how strongly the detected part of the electric motor vibrates over all recorded frequencies. In step S3, one spectral component (or also multiple spectral components) of the recorded vibration values is determined for one (or also multiple) assessment frequencies, wherein the assessment frequency/frequencies is/are formed in the present case by an order of the rotation frequency. In step S4, the vibration values of individual orders are assessed by determining a second assessment measure for the spectral component(s). In step S5, the assessment measures are compared and the vibration behavior is thus assessed. For this purpose, a quotient of the second assessment measure and the first assessment measure is formed and compared with a limiting value. If the quotient does not exceed the limiting value ("no"), the sequence continues with step S6, in which the current assessment frequency is not detected as a resonance point. The sequence then returns to step S1. If the quotient exceeds the limiting value ("yes"), it is decided that a resonance point exists and the criticality of the resonance point is assessed in step S7. For this purpose, the effective value of the recorded vibration values is compared with an amplitude limiting value in step S8. If the effective value does not exceed the amplitude limiting value ("no"), the resonance point in step S9 is assessed as not critical and therefore does not require special treatment. The method returns to step S1. If the effective value exceeds the amplitude limit ("yes"), the resonance point is classified as critical in step S10. In step S11 one or more actions are triggered. This can include outputting an error message, correcting operating parameters, etc. The sequence then returns to step S1.

Figure 4:
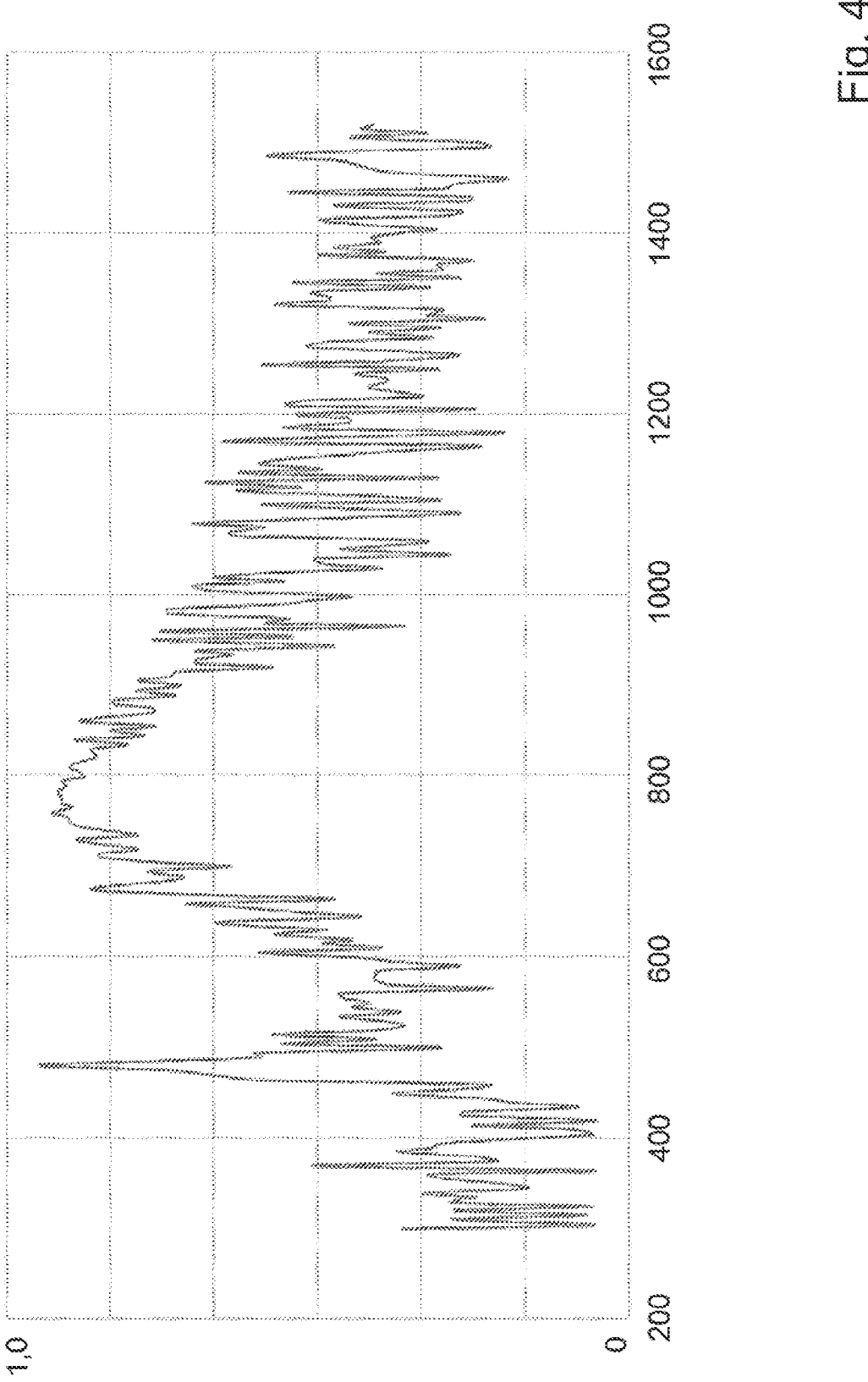
FIG. 4 shows a diagram of a quotient of a second assessment measure and a first assessment measure over speeds of an electric motor.

FIG. 4 shows a diagram having a quotient of a second assessment measure and a first assessment measure over the speed. The first order is selected as the assessment frequency, i.e., a frequency that corresponds to the rotation frequency of the electric motor. The electric motor is part of a fan, more precisely a radial fan. The diagram shows how strongly the vibrations of the electric motor or fan are influenced by the first order. Two speed ranges can be seen where there is a resonance point: around 480 revolutions per minute (first peak) and between 680 and 870 revolutions per minute (two broad speed ranges with high values).

Figure 5:
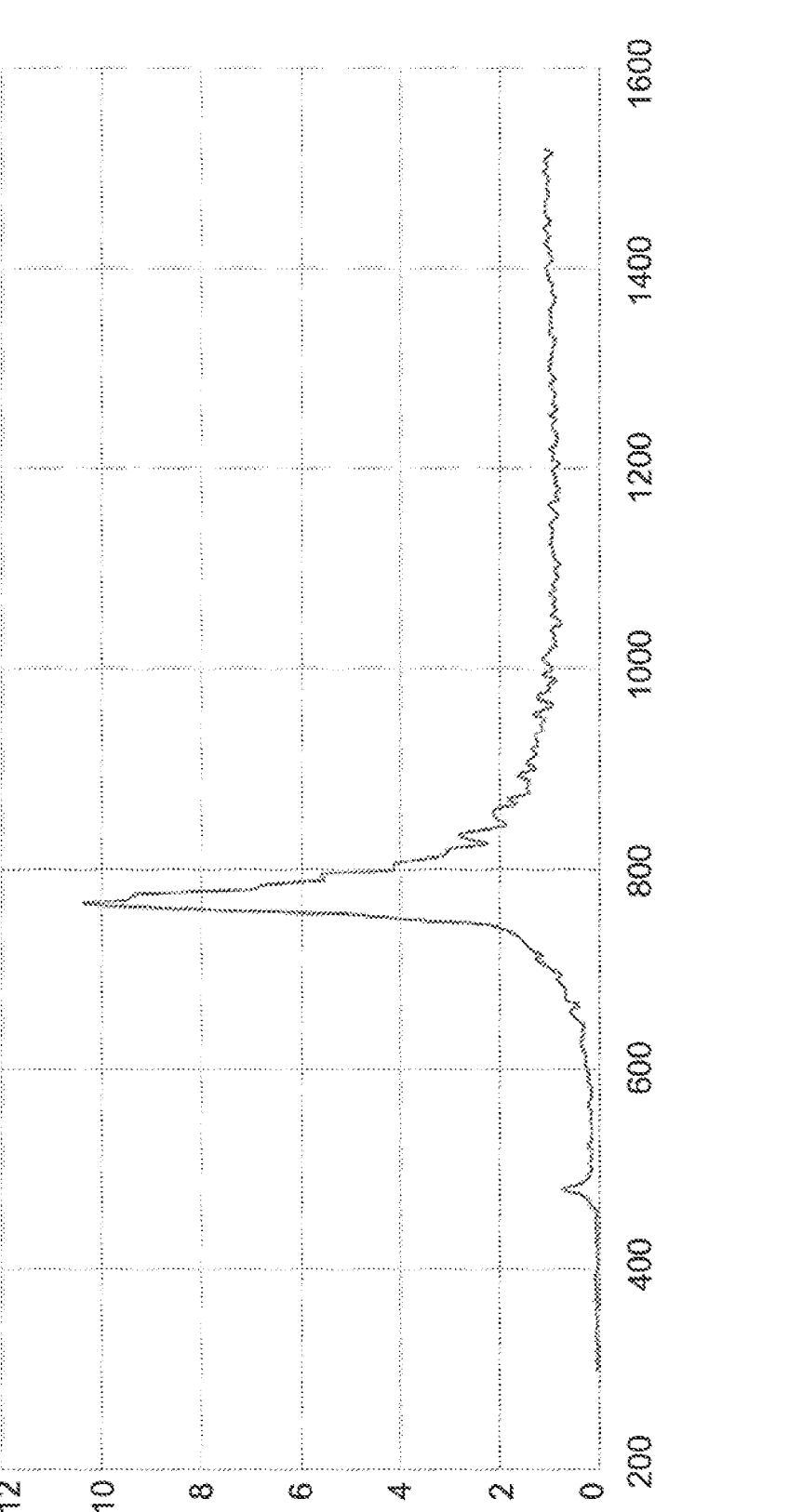
FIG. 5 shows a diagram having the associated spectral components versus the speed of the electric motor.

Whether these two resonance points are critical or not can be ascertained using the diagram according to FIG. 5, which shows a curve of the spectral component, i.e., in the present case the absolute amplitudes of the first-order vibrations. This shows that the first range around 480 revolutions per minute can be classified as non-critical, the second range can be classified as critical, especially at 765 revolutions per minute.

This example shows that an assessment of the current operating state of a fan can be carried out in this way. The state monitoring disclosed here does not require the fan to run up or run down. The measurement of vibrations can take place continuously or at regular time intervals.

To avoid repetition with regard to further advantageous embodiments of the teaching disclosed here, reference is made to the general part of the description and to the appended claims.

Finally, it is to be expressly noted that the above-described exemplary embodiments are used solely to explain the claimed teaching, but do not restrict it to the exemplary embodiments.

LIST OF REFERENCE NUMERALS

2 stator
3 motor axis
4 bearing tube
5 bearing receiving area
6 stator bushing
7 electronics housing
8 circuit board
9 vibration sensor
10 potting compound
11 potting compound
12 screw
13 hole
14 first assessment unit
15 analysis unit
16 second assessment unit
17 evaluation unit
18 limiting value memory

The invention claimed is:

1. A method for assessing a vibration behavior of an electric motor, such as an electric motor of a fan, and/or its operating environment, comprising:
   generating recorded vibration values by recording vibrations of at least one part of the electric motor at a plurality of different frequencies by means of a vibration sensor, ascertaining a first assessment measure for the recorded vibration values, wherein the first assessment measure is representative of a strength of the vibrations of the at least one part of the electric motor across the plurality of different frequencies, determining a spectral component of the recorded vibration values for an assessment frequency, ascertaining a second assessment measure for the spectral component of the recorded vibration values, wherein the second assessment measure is representative of a strength of the vibrations of the at least one part of the electric motor at the assessment frequency, identifying the assessment frequency as a resonance point when a ratio of the second assessment measure to the first assessment measure exceeds a predetermined limiting value, and adjusting a setting of a regulation system of the electric motor when the result of the identifying step indicates that the assessment frequency is a resonance point.

2. The method according to claim 1, wherein the assessment frequency is formed by an order of a base frequency of the electric motor.

3. The method according to claim 2, wherein a first order is used as the assessment frequency to determine whether the assessment frequency is a resonance point caused by unbalance.

4. The method according to claim 2, wherein the base frequency is dependent on a speed of the electric motor.

5. The method according to claim 1, wherein the determining, ascertaining a second assessment measure, identifying and adjusting steps are repeated for multiple assessment frequencies.

6. The method according to claim 1, wherein a detected resonance point is additionally assessed at least by one of comparing an amplitude and/or an effective value of a strength of the recorded vibration values with a predetermined amplitude limiting value, ascertaining a vibration shape, and ascertaining a vibration mode.

7. The method according to claim 1, wherein the method is performed during at least one of: when the electric motor is commissioned; during ongoing operation of the electric motor; after a predefined time span has elapsed; and when an operating parameter of the electric motor is changed.

8. The method according to claim 1, further comprising generating a suggestion for mitigating negative effects of a resonance point when the assessment frequency is identified as a resonance point.

9. The method according to claim 8, wherein the suggestion includes a location and/or extent of a balancing mass and/or a suppression corridor.

10. The method according to claim 1, wherein the predetermined limiting value is at least one of: greater than or equal to 50%; greater than or equal to 60%; and greater than or equal to 70%.

11. The method according to claim 1, wherein at least one of the first and the second assessment measure is ascertained by forming an effective value of a strength of the recorded vibration values.

12. An electric motor, comprising:

a vibration sensor which is designed to record vibrations of at least one part of the electric motor and to generate recorded vibration values at a plurality of different frequencies, a first assessment unit which is designed to ascertain a first assessment measure, wherein the first assessment measure is representative of a strength of the vibrations of the at least one part of the electric motor across the plurality of different frequencies, an analysis unit which is designed to determine a spectral component of the recorded vibration values for an assessment frequency, a second assessment unit, which is designed to ascertain a second assessment measure for the spectral component of the recorded vibration values, wherein the second assessment measure is representative of a strength of the vibrations of the at least one part of the electric motor at the assessment frequency, an evaluation unit which is designed to identify the assessment frequency as a resonance point when a ratio of the second assessment measure to the first assessment measure exceeds a predetermined limiting value; and a regulation system that is designed to adjust regulation and/or control of the electric motor when the assessment frequency is identified as a resonance point.

13. The electric motor according to claim 12, wherein the vibration sensor is designed to at least one of: record vibrations along multiple axes, wherein the multiple axes stand perpendicular to one another in pairs and wherein one of the multiple axes is arranged parallel to a motor axis/ motor shaft of the electric motor, record a vibration speed and/or record a vibration acceleration.

14. The electric motor according to claim 12, wherein the electric motor comprises an output device which is designed to output information about any identified resonance points, wherein the output device can be designed to upload the information into a cloud system.

15. The electric motor according to claim 12, wherein the analysis unit is designed to carry out a Fourier transformation, an FFT—Fast Fourier Transform—and/or a Görtzel algorithm and/or frequency band filtering.

16. A fan, comprising an impeller and an electric motor according to claim 12, wherein the impeller is coupled to a rotor of the electric motor.

17. A system with an operating environment and a drive, wherein the drive comprises a fan according to claim 15, wherein the operating environment interacts with the drive and wherein the drive is designed to record and assess both vibrations of the drive and vibrations in the operating environment.

18. The fan comprising an impeller and a motor, wherein the fan is configured to carry out a method according to claim 1.

* * * * *